United States Patent [19]
Ripley et al.

[11] Patent Number: 5,916,434
[45] Date of Patent: Jun. 29, 1999

[54] PROCESS FOR REMOVAL OF PETROLEUM FROM PARTICULATE MATERIALS

[75] Inventors: Ian Stanley Ripley, Middlesbrough; Antony Hugh Needham, Guisborough, both of United Kingdom

[73] Assignee: Great Eastern (Bermuda) ltd., Hamilton, Bermuda

[21] Appl. No.: 08/513,757

[22] PCT Filed: Feb. 24, 1994

[86] PCT No.: PCT/GB94/00367

§ 371 Date: Jun. 28, 1996

§ 102(e) Date: Jun. 28, 1996

[87] PCT Pub. No.: WO94/19122

PCT Pub. Date: Sep. 1, 1994

[30] Foreign Application Priority Data

Feb. 24, 1993 [GB] United Kingdom .................. 9303743

[51] Int. Cl.$^6$ ............................. C10G 1/00; B08B 5/00
[52] U.S. Cl. ......................... 208/407; 134/19; 134/25.1; 134/33; 134/37
[58] Field of Search ............................. 208/407; 134/19, 134/25.1, 33, 37

[56] References Cited

U.S. PATENT DOCUMENTS

| | | | |
|---|---|---|---|
| 3,627,289 | 12/1971 | Erman | 134/19 |
| 4,479,920 | 10/1984 | Dodson | 422/143 |
| 4,559,719 | 12/1985 | Dodson | 34/10 |
| 4,715,965 | 12/1987 | Sigerson et al. | 210/800 |
| 4,909,811 | 3/1990 | Dodson | 55/92 |
| 4,952,140 | 8/1990 | Dodson | 34/10 |
| 5,033,205 | 7/1991 | Dodson | 34/10 |
| 5,075,981 | 12/1991 | Dodson | 34/57 R |
| 5,098,481 | 3/1992 | Monlux | 134/19 |
| 5,256,208 | 10/1993 | Rafson | 134/25.1 |

FOREIGN PATENT DOCUMENTS

| | | |
|---|---|---|
| 0068853 | 1/1983 | European Pat. Off. . |
| 91/13948 | 9/1991 | WIPO . |
| 92/09377 | 6/1992 | WIPO . |

*Primary Examiner*—Walter D. Griffin
*Attorney, Agent, or Firm*—Dorsey & Whitney, LLP

[57] ABSTRACT

A process for the removal of petroleum contaminants from particulates is disclosed which involves (i) volatilization of the contaminated particulates in a toroidal dynamic bed (1) suspended in hot gases and/or (ii) extraction of the contaminated particulates in a toroidal dynamic bed (1) suspended in hot gases (such as hot combustion product gases, e.g., mixtures of $CO_2$, CO, $H_2O$, unconsumed hydrocarbons, in a variety of proportions) optionally containing steam or a solvent for the petroleum contaminant. The separation of the petroleum contaminant is to obtain solids containing less than 1, preferably less than 0.5 and most preferably less than about 0.1 weight percent of the contaminant. The process allows sufficient petroleum removal so that the solids are suitable for direct dumping in a landfill, assuming that the solids are free of non-petroleum environmental contaminants.

42 Claims, 3 Drawing Sheets

PROCESS FOR REMOVAL OF PETROLEUM FROM PARTICULATE MATERIALS

BRIEF DESCRIPTION OF THE INVENTION

A process for the removal of petroleum contamination of particulates by volatilization or extraction of the contaminated particulates in a toroidal dynamic bed suspended in a stream of hot gas(es) optionally containing a solvent for the petroleum contaminant.

BACKGROUND TO THE INVENTION

Waste petroleum constitutes one of the most pernicious environmental problems that man has imposed on this planet. One of the nastiest forms that it takes is petroleum contamination of solid particles. The solid particles derive from many compositions ranging from siliceous materials (e.g., sands, rocks, and the like), carbonaceous materials, clays and clay containing materials, floccular materials with high iron content typically originating from rust flakes, and the like. Recent oil spillages by tankers on European, Scottish and American coastlines dramatize the magnitude of the problem. Petroleum laden solids generated by other acts exist throughout the world, from Singapore to Bahrain to the United States of America. Whether from spillages on land or sea, waste petroleum or pitch land deposits, black oil residues generated in petroleum storage tanks, natural oil or asphalt deposits, in each instance, the removal of the petroleum contamination from the solids is expensive and heretofore generally ineffectual. The petroleum that deposits on the particulate materials will exhibit a higher viscosity owing to the higher surface area of the particulate and the volatilization from the petroleum deposited of some of the lower boiling components. This means that the petroleum so deposited will exhibit a higher viscosity and a greater degree of stickiness when heated so that thermal treatment of the particles causes them to fuse much like asphalt does in constructing a roadway.

A number of approaches have been tried or suggested for the removal of petroleum from solids. A favored approach involves filtering the contaminated solids to remove petroleum that easily separates followed by incineration of the solids to remove the residual petroleum that filtration does not separate. Filtration is relatively ineffective in separating the petroleum because, in any case, about a third of the petroleum will be retained in the voids between the packed particles. Other techniques for removing the petroleum retained by the solids include centering, decanting or hydra separating the waste petroleum and collecting the petroleum laden solids that represent an isolated product of the process. Then the solids may either be dumped in a landfill or incinerated. Dumping in landfills is prohibited in many areas of the world because of the adverse effects the residual petroleum has on insect and animal life, ground water and underground streams, and the like considerations. Incinerating waste petroleum is not cost effective or environmentally acceptable because of the necessity of dealing with $NO_x$, $SO_x$ and heavy metal emissions. In particular, the petroleum content of the solids after such treatment, such as by filtration, centrifugation and decantation, can be higher than 4–10 percent of the weight of the solids. At those levels of impurities, the solids are environmentally unsafe for landfills. Consequently, laws exist in many countries prohibiting such landfills.

A number of the processes that are promoted for the treatment of waste petroleum employ a final briquetting technique for accumulating the solids containing a residual petroleum content, into a form suitable for applications. This technique suggests the use of the briquettes as a construction material. This merely slows the environmental problem, not eliminate it. Over time, nature will break down the briquettes and eventually the retained petroleum leaches into the earth.

One of the problems that an engineer faces in cleaning solids to remove petroleum residues has to do with the stickiness of the petroleum under conditions that allow its separation from the surface of the solid. For example, one may solvate the petroleum and wipe it off the surface, but that is time consuming and costly because of the need for repeated treatments of the surface to reduce the petroleum concentrations to acceptable levels. It would also seem feasible to expose the particles to hot gases in a fluid bed. However, such dynamic bed applications are vulnerable to particle aggregation (agglomeration) which serves to drop the aggregated particles out of the bed and out of the fluid treatment. Thus, one would expect that fluidization of a bed of petroleum laden particles by a stream of hot gas would first soften the petroleum coating on the particle to a point that it is capable of sticking to other of the particles in the bed. This sticking would generate agglomerates of the particles with increased mass and they would precipitate from the fluid bed. Once they are removed from the bed, they are no longer treatable by the hot gases fed to the bed. When too much of the bed is agglomerated, the bed crashes and fluidization ceases. The agglomerated particles are more difficult to treat than their relatively smaller sized progenitor particles.

There is a need for processes that will effectively remove petroleum from solids so that the solids can be safely deposited in landfills without fear of pollution of underground water or creating other types of environmental problems. The process of this application achieves this by the separation of the residual petroleum in the solids in a useful fuel form or as a feed stock in a operation. A feature of the invention is the treatment of such contaminated solids in a toroidal dynamic bed such as achieved in the apparatus described in Dodson, U.S. Pat. No. 4,479,920, patented Oct. 30, 1984. For unexplainable reasons, the petroleum particles treated in a toroidal dynamic bed are not subject to the kind of agglomeration obtainable in a fluid bed. The technology embodied in the patent, commercially called the "Torbed Process," is being licensed by Davy McKee (London) Limited, London, U.K. The Torbed® Process is recommended (Gtoszek, "The Torbed Process: A Novel Concept in Heat and Mass Transfer," International Deep Mining Conference: *Innovations in Metallurgical Plant*, Johannesburg, SAIMM, 1990 and product brochure) for a number of applications, including:

The calcination of clays and lime, magnesite and dolomites to yield both 'dead-burnt' and highly reactive products;

The combustion of low calorific value/high ash content fuels in which the carbon burnout was in excess of 99%;

The production of lightweight aggregates through the firing and 'bloating' of clays;

Toxic waste incineration;

Regeneration of activated carbons;

Regeneration of catalysts;

Drying of sand, filter cakes, concentrates;

Vaporization;

Gasification;

Pyrolysis;

Heat transfer.

The advantages of the Torbed® Process are alleged to be:

(a) A substantial decoupling of support medium mass flow and 'fluidizing' velocity is achieved;

(b) High rates of heat and mass transfer may be realized by utilizing the high impingement velocities of the process gas stream;

(c) The dissipation of the velocity of the support medium provides the means of processing a widely graded material;

(d) Irregular shapes may be processed under strictly controlled conditions;

(e) The low mass and thermal inertia of the bed permits rapid responses to process controls;

(f) There is a low static pressure loss across the toroidal dynamic bed.

Other patents dealing with the Torbed® Process include: U.S. Pat. No. 4,559,719; U.S. Pat. No. 4,909,811; U.S. Pat. No. 4,952,140; U.S. Pat. No. 5,033,205; European Patent Public. 0 346 004 and U.S. Pat. No. 5,075,981. As can be seen from the description of this apparatus, it deals with a variety of specific tasks.

THE INVENTION

This invention relates to a process for the removal of petroleum contaminants from particulates by (i) volatilization of the contaminated particulates in a toroidal dynamic bed suspended in hot gases, (ii) extraction of the contaminated particulates in a toroidal dynamic bed suspended in hot gases (such as hot combustion product gases, e.g., mixtures of $CO_2$, CO, $H_2O$, unconsumed hydrocarbons, in a variety of proportions) optionally containing a solvent for the petroleum contaminant or steam or (iii) a combination of (i) and (ii). Of significance to the invention is the separation of the petroleum contaminant to obtain solids containing less than 1 weight percent of the petroleum contaminant, preferably less than 0.5 weight percent, most preferably less than about 0.1 weight percent of the contaminant. The process of the invention is capable of sufficient petroleum removal that the solids are suitable for direct dumping in a landfill assuming that the solids are free of non-petroleum environmental contaminants.

Of surprise is the fact that petroleum laden solid particulates can be treated in a fluid-like dynamic bed without agglomerating into larger particles that cannot be fluidized. It has been determined that such sticky type particulates can be effectively fluidized without agglomeration when the dynamics of the fluid bed includes gas flow that incorporates a lateral vector and a vertical vector within a walled toroidal zone that confines the particles along a toroidal path and the petroleum deposited on the particles has components with different levels of volatility. The combination of these vectors and the mixed volatility of the petroleum deposited on the particles, allows relatively high gas velocities so that the particles are buffeted by collisions between them and with the walled toroidal zone coupled with incremental solvation on the surfaces of the particles. The shape of the bed, that is, the retention of the particles within the zone where the bed is located, i.e., the walled toroidal zone, may be maintained even under a velocity that is high as compared with the upward velocity of gases in a typical fluid bed operation. The combination of the two vectors and the walls that form a toroidal path causes a level of turbulence and collisions in the dynamic bed so as to introduce an overall shear mechanism whenever particles aggregate in the first stages of the process of agglomeration, and this shear force counteracts the formation of agglomeration that impedes good dynamic bed operation. Aiding this action is a concurrent in situ solvation of the petroleum on the particles stemming from the presence of petroleum components having a variability in volatility. As a result of the fluidized particles being bathed in the hot gases that surround and suspend them, the gas temperature causes a portion of the petroleum components to liquefy thereby solvating other components of the petroleum deposited on the particles. This in situ solvation enhances volatilization of essentially all of the petroleum deposited on the particles and the thus volatilized petroleum is readily extracted from the solid particles by the relatively high velocity gases sweeping the surfaces of the particles. This internal solvation coupled with the turbulence within the bed cause the petroleum contaminants to be efficiently extracted from the particle surfaces.

As the particles unload their petroleum content, they become lighter and thus rise in the dynamic bed. This process creates a loose stratification within the bed with the heavier particles tending to tumble at the bottom of the bed and the lightest particles tending to float at the top of the bed. The particles at the top of the dynamic bed are captured in a cleansed particle recovery zone separate from the toroidal zone. The gases fed to the bed, as they leave the toroidal zone, are laden with petroleum vapor and they are passed to a gas-liquid separation zone for the recovery of the petroleum and the gas component. The latter may be recycled to the toroidal zone.

This process is maintained as a continuous process by the constant feed of petroleum laden particles to the top of the bed. It is desirable to uniformly feed the particles to the top of the bed so that the bed's operation is not upset and surges are avoided. Thus, the heaviest of the particle descend in the dynamic bed while the lightest of the particles ascend to the top of the bed. Remarkably, the light particles are not captured by the heavier petroleum laden particles that are fed to the bed to the extent that adverse agglomeration occurs.

In another embodiment of the invention, a solvent for the petroleum contamination on the particles or steam is intimately mixed with the hot gas stream fed to the particles that form the dynamic bed in order to enhance the in situ solvation ongoing on the particle surface. This hot solvent or steam is preferably sprayed into the hot gas stream so as to become a vapor component of it. The spray droplets may be volatilized within the hot stream and this reduces the particle size of the solvent or steam droplets. As the solvent or steam contacts the particles, the solvent or steam is condensed on the surface of the petroleum contaminant. This quickly reduces the viscosity of the petroleum contaminant and makes it easier to volatilize and evaporate in the gas stream. The off gases from the bed are passed to a gas-liquid separation zone for the separate recovery of the petroleum, the solvent or water, to the extent present, and the gas component. The last may be recycled to the toroidal zone. It may not be desirable to separate the solvent or water from the gas component and the combination may be recycled to the toroidal zone. In this case, it may become desirable to withhold separate addition of solvent or steam to the gas stream and rely on the presence of the recycled solvent or water in the gas stream, with the exception of periodic injection of solvent or water (steam) to makeup for solvent or water lost during the course of the process.

In another embodiment of the invention, the process may be initiated with or without solvent or steam addition to the hot gas stream that maintains the dynamic bed. However, during the recovery phase where the gases laden with petroleum are subjected to separation in the gas-liquid separation zone, the more volatile components of the petroleum are not condensed from the gas stream. These volatile components are solvents for the petroleum contamination on the particles. At least a portion of these volatile components are kept in the gas stream recycled to the toroidal dynamic bed. In this fashion, the gas stream contains the in situ provided volatile component of the petroleum residue on the particle, and it becomes an added extraction solvent assisting in the removal of the petroleum contaminant from the particles added to the toroidal dynamic bed.

DETAILED DESCRIPTION OF THE INVENTION

Figure 1:
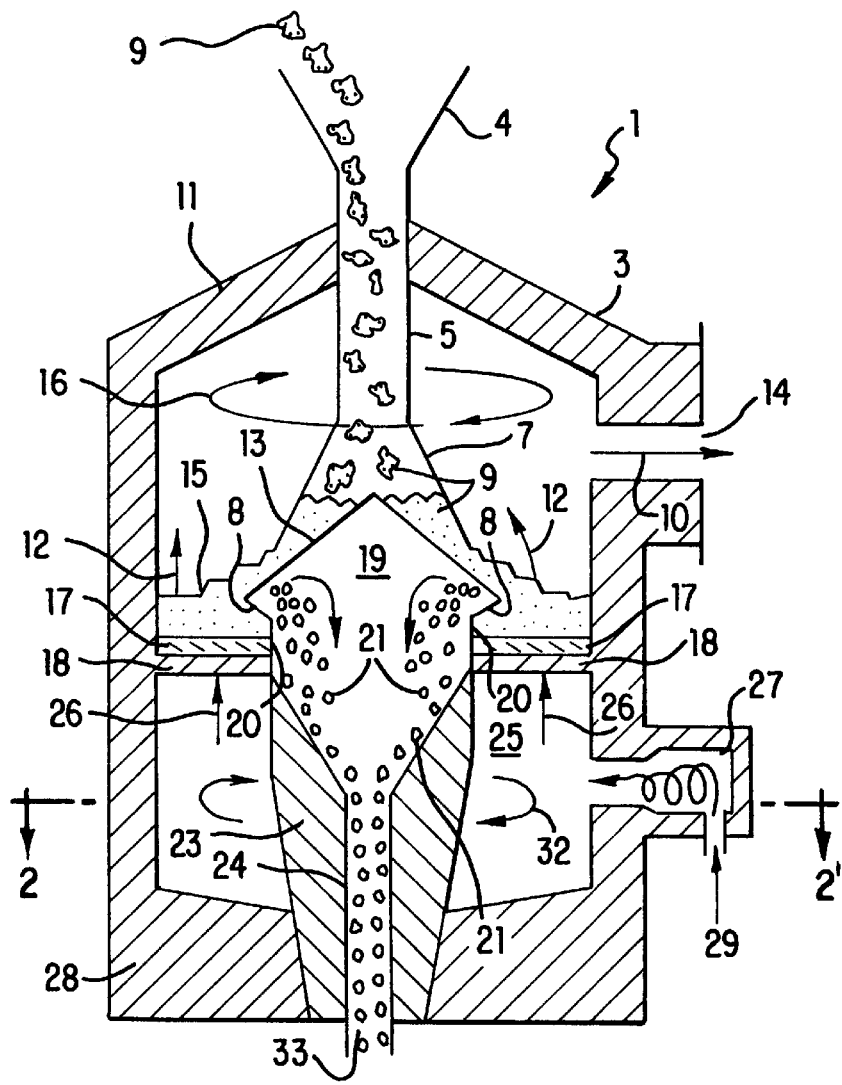
FIG. 1 is a schematic side view, without concern for proportions, of a toroidal dynamic bed apparatus in which the particles are oversized.

As noted above, the invention is directed to cleaning up solid particulate materials that contain a petroleum contaminant. Though the amount of contaminant is not critical to the invention, the amount of contaminant associated with the particles which are subjected to the process of this invention should be great enough to justify the cost of the treatment to the particulate matter and not so great that much of the petroleum contamination is more easily removed by other commercially available processes such as by filtration. These are practical considerations that in no way set limits on the practice and scope of this invention. Therefore, where the particulate matter contains high levels of petroleum contaminant, viz., an amount greater than about 20 weight percent, it would be more practical from a cost standpoint to remove as much petroleum contamination by such other processes as filtration, centrifugation, decantation, distillation, conventional fluid bed extraction where operative, hydroseparation, and the like. Generally, the amount of petroleum contaminant in the particles is about 0.5 to 20 weight percent of the average weight of the contaminated particles. It will generally be preferred to reduce the averaged petroleum content to below about 15 weight percent. Usually, the average weight of the petroleum in the particles will range from about 1 to about 15 weight percent.

The particles that are subjected to the treatment in the toroidal dynamic bed may be of any reasonable size capable of fluidization. However, the ability to fluidize the particulate material is a criteria in selecting particle size. The bed of particulate material supported by the hot gas stream is relatively closely packed. The hot gas stream's energy dissipates in the shallow bed of material making up the toroidal dynamic bed, so that the superficial velocity of the gas stream immediately above the bed is lower than the terminal velocities of the particles thereby preventing excessive particle lift-off. The shape of the particles need not be spheroidal or of a uniform size. For example, the particles may be irregular or regular, flakes, rings, extrudates, or any other configuration.

In the typical case, the particulate material that is subjected to the toroidal dynamic bed treatment of the invention will be masticated or subjected to other grinding procedures so as to bring the particles to a reasonable size for handling in the bed There are compositions that possess such large concentrations of agglomerated materials that it will be necessary to subject the composition to a grinding action. Grinding can be effected in a pebble mill, stone mill, horizontal media mill, an industrial macerator (such as those obtainable from Hidrostal Process Engineering Ltd., Newbury, England), and the like type of commercially available equipment. When the material contains odd objects, they can be removed by hand or by magnets or any other convenient method. The average particle size and the particle size distribution of the material fed to the bed is not critical in the practice of the invention owing to the centrifugal manner of the bed's formation. The centrifugal force propels large and small particles to the bed's retaining wall and eventually all of the particles flow to the internal weir where they are separated from the bed. Thus a wide range of particle sizes and particle size distribution are treatable according to the invention. A convenient method for preparing the solid particles for treatment according to the invention is to dissolve a mass of the particles in a solvent for the petroleum, subject the solvated mass to an ultrasonic treatment and then subject the solvated mass to a nonsolvent for the petroleum. The particles are separated from the petroleum and the solvent, and precipitate in the nonsolvent. Precipitation serves to enhance separation of the particles and the collected particles have a better flow, allowing them to be easily fed to the toroidal dynamic bed. This method is described in copending UK patent application serial no. 9300969.4, filed Jan. 19, 1993.

The principles of operation of a toroidal dynamic bed is predicated on subjecting particles to highly turbulent flows so that the rate of the heat and mass transfer is proportional to the rate at which the boundary layer is exchanged As we know, heat and mass transfer is enhanced when the boundary layer of gas around a particle is exchanged. A way to effect turbulence is to expose the particles to high velocity gas streams. A caveat to doing this in a fluid bed is the need to maintain the material under specific process flow conditions. Terminal velocities of the particles generally determine the limits of process gas velocity and hence the heat and mass transfer rate. In considering control over the impingement of a high velocity gas stream on particulates, the gas stream's energy is dissipated by or through the material being processed without subjecting the material to undue physical damage. This is to be likened to the 'hovercraft' principle which utilizes a momentum exchange between a gas stream and a mass. By inverting the flow of the gas stream and by channeling it through a series of blades which effects the toroidal dynamic bed, the resultant linear jets act as a support medium for a shallow bed (50–75 mm in depth) of particles which float over this support medium. The blades convert the pressure head in the gas stream into a velocity head and, by suitable blade design, forces can be exerted on the bed causing the bed to lift and be transported horizontally. This exchange of energy is the first fundamental difference between the toroidal dynamic bed and a fluidized bed reactor. Since the momentum of the gas stream is the product of the mass flow and its velocity, a given bed may be supported by a low velocity gas stream with a high mass flow rate or a high velocity gas stream with a corresponding low mass flow rate.

The fixed blades are reconfigurable, thus allowing matching of a specific gas flow rate and the requirements of the process dictated by the character of the petroleum contaminated particles that one chooses to treat. The resultant bed of particles is closely packed. The gas stream may impinge on the lower layer of the bed at velocities of 75 to 150 meters per second and the energy of the stream would be dissipated in the shallow bed of material whereby the superficial velocity of the gas stream immediately above the bed is lower than the terminal velocities of the particles. Consequently, excessive particle lift-off is prevented In practice, hot gases issue from a petroleum burner as a spiraled gas stream with the velocities indicated and are passed into angularly positioned fixed blades into the toroidal dynamic bed of petroleum contaminated particles to form a turbulent gas-supported bed of the contaminated solids, removing any remaining petroleum by extraction/vaporization, and giving a "clean" dry particulate product. Petroleum in the exhaust gas stream is recovered by condensation. Since the heating process is closely controlled, the undesirable elements produced by incineration are avoided, and emissions are more easily held within specified local authority limits.

Figure 2:
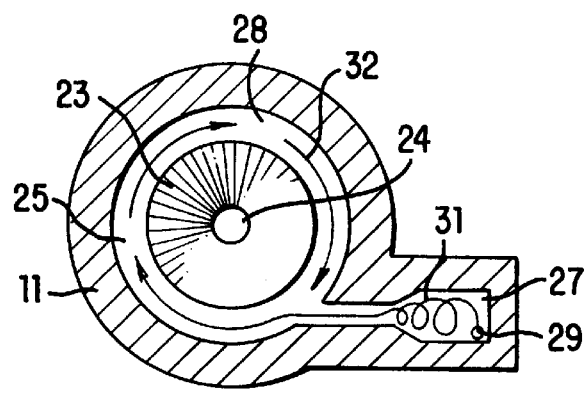
FIG. 2 is a top plan view of the base of the apparatus of FIG. 1 taken from line 2'—2'.

The toroidal dynamic bed process is illustrated in FIGS. 1–7. FIG. 1 schematically and non-proportionally illustrates the toroidal dynamic bed extractor 1. Petroleum particulates 9 (shown to be abnormally large in the drawing) are fed to feed tube 5 through funnel section 4 located within housing 3. Housing 3 contains an insulated wall 11 with an insulated base section 28. A free-flowing particulate 9 of sufficient size, e.g., 90–160 micron, generally has sufficient mass to gravitate without special assistance to the fixed blades 17 by flowing into conical section 7 of feed tube 5 onto sloping cone section 13 and then into toroidal dynamic bed zone 15 residing over fixed blades 17 and enclosed by wall 11 and weir 20. Otherwise, particulates 9 may be assisted in their passage to zone 15 by a rotating vane, vibrator or screw feeder (all not shown) provided on surface 13 or within tube 5. FIG. 1 shows particles 9 accumulating on surface 13 and being distributed as a mass to toroidal dynamic bed zone 15. While that is occurring, fuel is introduced via port 29 to combustion chamber 27 where a turbulent hot gas stream 31 is projected into toroidal gas zone 25. Small amounts of water can be included with the fuel so that as the fuel is added, the water component is converted to steam and this enhances petroleum stripping from the petroleum contaminated particles. As shown in FIG. 2, combustion chamber 27 is tangentially aligned with toroidal gas zone 25 so that the hot combusted gases are sent in a spiraling direction in zone 25, around centrally located insulated wall 23. A separate line to zone 25 (not shown) can be added for introduction of a separate feed of solvent or steam. Suitable solvent includes light ends from the petroleum contaminants being removed from particles 9, or specific solvents such as diesel or kerosene, or toluene, xylene, benzene, and the like. The toroidal shapes of bed zone 15, fixed blades 17, tube 5, weir 20 and wall 23 may be circular or elliptical. The object of the selection of shape involves imposing an angular vector to the gas streams fed to the fixed blades 17 and the flow of the gases from the fixed blades 17 through toroidal dynamic bed 15. Rather than providing a combustion chamber 27 within extractor 1, the combustion chamber may be provided outside of the extractor and the hot gases fed tangentially to zone 25.

In this embodiment, all of the gases are shown moving clockwise. The gases may just as well be moved counterclockwise. The gases following clockwise direction 32 rise, as shown by direction 26, past fixed bed support 18 that opens to fixed blades 17 which are pitched to provide gas flow in a clockwise direction, and then into zone 15 where the particles are gas suspended as a shallow bed that is moving in a clockwise direction. The bed's depth may vary depending on the size of the bed (i.e., concentration of particles and their size and mass), the dimensions of zone 15 and the gas velocity. The off-gases laden with petroleum vapor that move out of toroidal dynamic bed 15 travel in an upwardly direction 12 into the open chamber circumscribing tube 5 as a clockwise flowing stream 16 from which it exits housing 3 as stream 10 through circular exit port 14 in wall 11.

As the toroidal dynamic bed is circumferentially propelled around bed zone 15 which circumscribes weir 20, confined by round wall 11, particles 9 lose petroleum contaminants and become lighter. This causes them to rise in bed 15. Eventually, the lightest particles will topple over weir 20, in the circumferential slot 8 opening into particle separation zone 19. The cleansed particle path is illustrated in FIG. 1 by the arrow extending from zone 15 through slot 8 into zone 19. The cleansed particles 21 topple within zone 19 via the inclined surfaces into withdrawal tube 24, out of opening 33 where they are recovered for deposit in a landfill.

Figure 3:
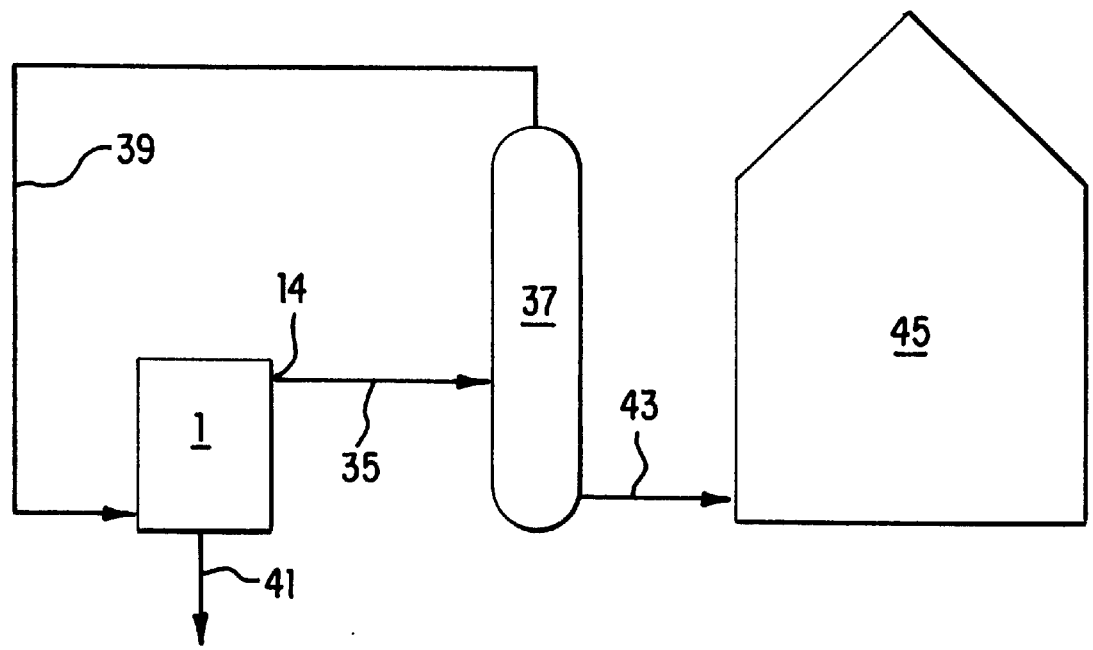
FIG. 3 is a schematic plan of the process involving the toroidal dynamic bed separation of petroleum contamination, condensation of the petroleum and recycling of gases.

FIG. 3 is a schematic illustration of one embodiment for conducting the process of the invention. In this embodiment, toroidal dynamic bed extractor 1 provides a petroleum containing gas stream 35 that exits from port 14, and is sent to condenser 37. Liquid petroleum product is removed from condenser 37 through line 43 to storage facility 45. The gases in condenser 37, which may contain water, solvent or light ends, may be recirculated via line 39 to toroidal dynamic bed extractor 1. If the light ends or solvent are condensed with the petroleum product, then there may be no need for the gas recycle. The recycled gas may be added to the fuel stream or separately fed to zone 25 to be mixed with the hot gases. The recovered solids containing minimal petroleum contamination are deposited in landfill 41.

Figure 7:
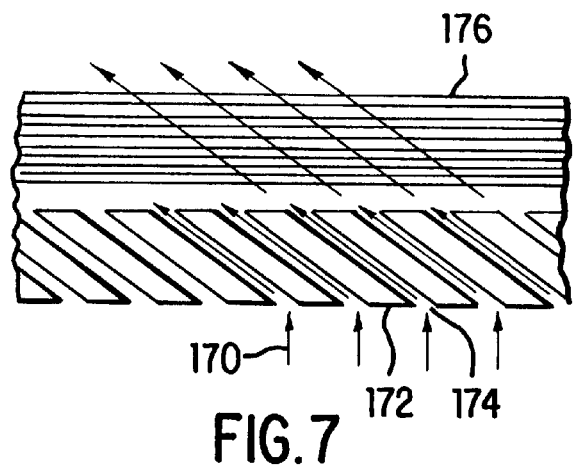
FIG. 7 is a cross sectional schematic side view of the dynamic bed formed in operation of the apparatus of FIGS. 4—6 and the fixed blades used in directing fluid flow.
Figures 4, 5:
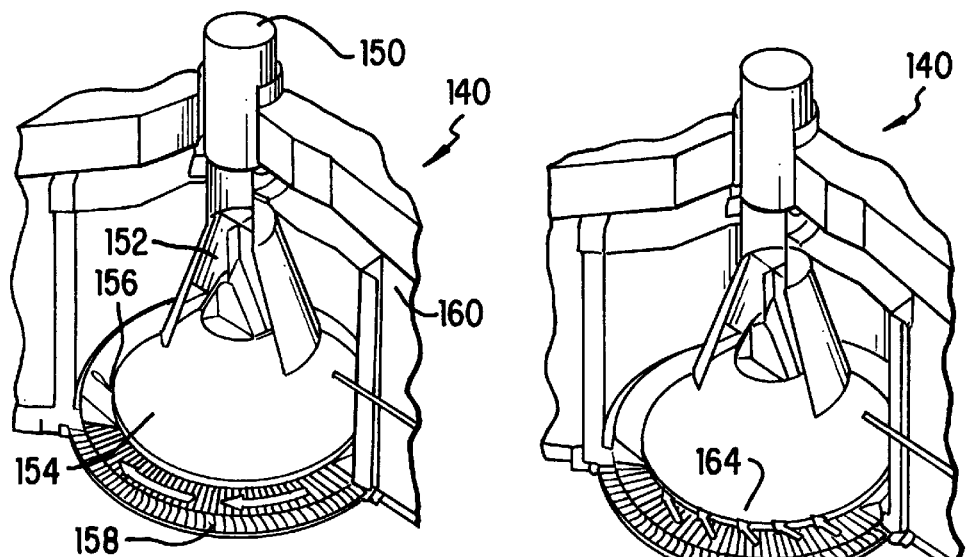
FIG. 4 is a cutaway perspective view of a toroidal dynamic bed apparatus illustrating circulatory and toroidal particle motion.
FIG. 5 is the same view as FIG. 4 except that it illustrates gas flow through the fixed blades used in the apparatus.
Figure 6:
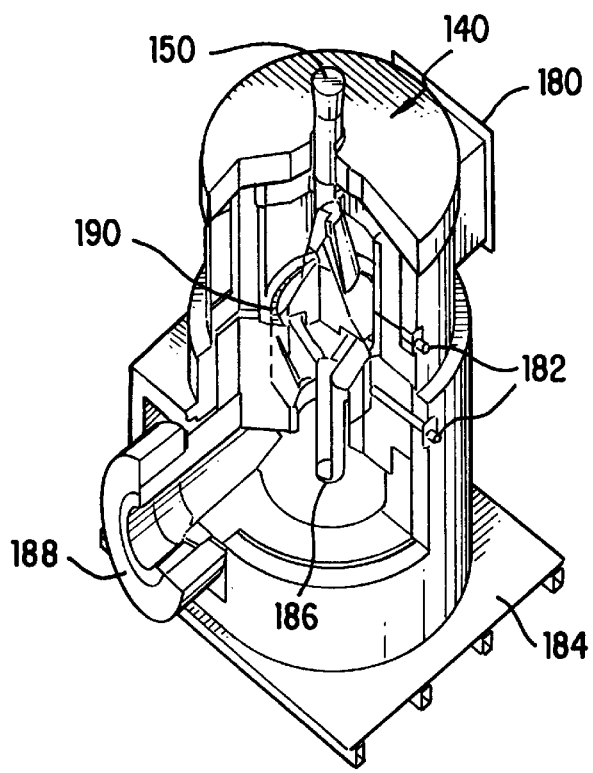
FIG. 6 is the same view as FIGS. 4 and 5 showing additional features of the apparatus, such as the burner.

FIGS. 4–7 illustrate embodiments of the Torbed® device used in carrying out the Torbed® process. Torbed® device 140 contains within a cylindrical insulated wall 160, a feed tube 150, through which the particulate solids are fed to be discharged from the other end 152, into rotating vanes, onto a sloping surface 154 to be ejected to the peripheral blade zone 190 enclosed by an inwardly sloped overhang surface. Hot fluid from burner 188 is injected tangentially creating an upward flow 156 through fixed blades 158 and through the particles sufficient to form a toroidal moving dynamic particle bed. As shown in FIG. 5, hot fluid 162 is emitted through blades 164 that ejects the fluid in an angular direction 164. The hot fluid leaves the device through fluid exhaust outlet 180 carrying with it petroleum that coated the particles. The hot fluid is fed to a condenser that allows the petroleum component to separate. Temperature control is effected by measurements taken with thermocouples 182. The treated fluid may be subjected to scrubbing to insure petroleum removal. A dynamic bed of hot particles 176 is spiraled about zone 190 in direction 164 that follows the pitch of blades 172 and the tangential feed from burner 188. As shown in FIG. 7, the hot fluid 170 is fed to the blade zone between the blades 172 in the spaces 174 between blades 172 and the slant of blades 172 causes the fluid stream to have a similarly angular pitch as shown by the arrows above the array of blades 172. The particles fed to the device form dynamic bed 176 that travels in the direction of the fluid stream restrained by the geometry of the path of the peripheral blade zone 190. This is fully discussed in U.S. Pat. No. 4,479,920, suppra.

The hot fluid may be at a temperature higher than 1400° C., preferably at a temperature of from about 100° C. to about 1400° C., most preferably from about 150° C. to a temperature less than about 1400° C., measured by thermocouples 182, as the hot fluid flows around the particles, suspending them and vaporizing petroleum adhering to the particles. The fluid is generally combustion gases that emanate from the burner. However, the burner assembly that issues the hot gases in a spiral direction into the array of blades 172, may be fitted with injection sites downstream of the burner so that other gaseous or vaporous materials may be incorporated in the fluid stream. Such materials include a variety of gases such as air, carbon dioxide, nitrogen, methane, ethane, propane, isopropane, hexane, toluene, and the like. It is desirable to use as the fluid, a gaseous mixture that is capable of dissolving the petroleum affixed to the particles. This materially facilitates the removal of the petroleum from the particles by a combination of vaporization and extraction. The solids are recovered in the central discharge chamber 186 and sent to landfill.

We claim:

1. A process for separating petroleum contaminants from solid particles which comprises feeding the particles into a toroidal dynamic bed, suspending the particles in hot gases, cleansing the particles by removing a hot gas stream from the bed containing petroleum recovered from the particles, and separately recovering the isolated petroleum and the isolated cleansed particles.

2. The process of claim 1 wherein the hot gases are combustion gases.

3. The process of claim 1 wherein the hot gases contain a solvent for the petroleum.

4. The process of claim 1 wherein the hot gases contain steam.

5. The process of claim 1 wherein volatile components of the petroleum contaminant solvate other of the petroleum contaminant while the particles are in the toroidal dynamic bed undergoing suspension in the hot gases.

6. The process of claim 1 wherein in the recovery of the isolated petroleum, gases therewith are recycled to the toroidal dynamic bed.

7. The process of claim 1 wherein the petroleum contaminated particles are subjected to filtration prior to treatment in the toroidal dynamic bed.

8. The process of claim 1 wherein the petroleum contaminated particles are subjected to centrifugation prior to treatment in the toroidal dynamic bed.

9. The process of claim 1 wherein the petroleum contaminated particles are subjected to decantation prior to treatment in the toroidal dynamic bed.

10. The process of claim 1 wherein the petroleum contaminated particles are subjected to hydroseparation prior to treatment in the toroidal dynamic bed.

11. The process of claim 1 wherein the contaminated particles contain more than 1 weight percent petroleum contamination and the isolated cleansed particles contain less than about 1 weight percent petroleum contamination.

12. The process of claim 2 wherein the contaminated particles contain more than 1 weight percent petroleum contamination and the isolated cleansed particles contain less than about 1 weight percent petroleum contamination.

13. The process of claim 3 wherein the contaminated particles contain more than 1 weight percent petroleum contamination and the isolated cleansed particles contain less than about 1 weight percent petroleum contamination.

14. The process of claim 4 wherein the contaminated particles contain more than 1 weight percent petroleum contamination and the isolated cleansed particles contain less than about 1 weight percent petroleum contamination.

15. The process of claim 5 wherein the contaminated particles contain more than 1 weight percent petroleum contamination and the isolated cleansed particles contain less than about 1 weight percent petroleum contamination.

16. The process of claim 6 wherein the contaminated particles contain more than 1 weight percent petroleum contamination and the isolated cleansed particles contain less than about 1 weight percent petroleum contamination.

17. The process of claim 7 wherein the contaminated particles contain more than 1 weight percent petroleum contamination and the isolated cleansed particles contain less than about 1 weight percent petroleum contamination.

18. The process of claim 8 wherein the contaminated particles contain more than 1 weight percent petroleum contamination and the isolated cleansed particles contain less than about 1 weight percent petroleum contamination.

19. The process of claim 9 wherein the contaminated particles contain more than 1 weight percent petroleum contamination and the isolated cleansed particles contain less than about 1 weight percent petroleum contamination.

20. The process of claim 10 wherein the contaminated particles contain more than 1 weight percent petroleum contamination and the isolated cleansed particles contain less than about 1 weight percent petroleum contamination.

21. The process of claim 11 wherein the contaminated particles contain more than 1 weight percent petroleum contamination and the isolated cleansed particles contain less than about 0.5 weight percent petroleum contamination.

22. The process of claim 12 wherein the contaminated particles contain more than 1 weight percent petroleum contamination and the isolated cleansed particles contain less than about 0.5 weight percent petroleum contamination.

23. The process of claim 13 wherein the contaminated particles contain more than 1 weight percent petroleum contamination and the isolated cleansed particles contain less than about 0.5 weight percent petroleum contamination.

24. The process of claim 14 wherein the contaminated particles contain more than 1 weight percent petroleum contamination and the isolated cleansed particles contain less than about 0.5 weight percent petroleum contamination.

25. The process of claim 15 wherein the contaminated particles contain more than 1 weight percent petroleum contamination and the isolated cleansed particles contain less than about 0.5 weight percent petroleum contamination.

26. The process of claim 16 wherein the contaminated particles contain more than 1 weight percent petroleum contamination and the isolated cleansed particles contain less than about 0.5 weight percent petroleum contamination.

27. The process of claim 17 wherein the contaminated particles contain more than 1 weight percent petroleum contamination and the isolated cleansed particles contain less than about 0.5 weight percent petroleum contamination.

28. The process of claim 18 wherein the contaminated particles contain more than 1 weight percent petroleum contamination and the isolated cleansed particles contain less than about 0.5 weight percent petroleum contamination.

29. The process of claim 19 wherein the contaminated particles contain more than 1 weight percent petroleum contamination and the isolated cleansed particles contain less than about 0.5 weight percent petroleum contamination.

30. The process of claim 20 wherein the contaminated particles contain more than 1 weight percent petroleum contamination and the isolated cleansed particles contain less than about 0.5 weight percent petroleum contamination.

31. The process of claim 21 wherein the contaminated particles contain more than 1 weight percent petroleum contamination and the isolated cleansed particles contain less than about 0.1 weight percent petroleum contamination.

32. The process of claim 22 wherein the contaminated particles contain more than 1 weight percent petroleum contamination and the isolated cleansed particles contain less than about 0.1 weight percent petroleum contamination.

33. The process of claim 23 wherein the contaminated particles contain more than 1 weight percent petroleum contamination and the isolated cleansed particles contain less than about 0.1 weight percent petroleum contamination.

34. The process of claim 24 wherein the contaminated particles contain more than 1 weight percent petroleum contamination and the isolated cleansed particles contain less than about 0.1 weight percent petroleum contamination.

35. The process of claim 25 wherein the contaminated particles contain more than 1 weight percent petroleum contamination and the isolated cleansed particles contain less than about 0.1 weight percent petroleum contamination.

36. The process of claim 26 wherein the contaminated particles contain more than 1 weight percent petroleum contamination and the isolated cleansed particles contain less than about 0.1 weight percent petroleum contamination.

37. The process of claim 27 wherein the contaminated particles contain more than 1 weight percent petroleum contamination and the isolated cleansed particles contain less than about 0.1 weight percent petroleum contamination.

38. The process of claim 28 wherein the contaminated particles contain more than 1 weight percent petroleum contamination and the isolated cleansed particles contain less than about 0.1 weight percent petroleum contamination.

39. The process of claim 29 wherein the contaminated particles contain more than 1 weight percent petroleum contamination and the isolated cleansed particles contain less than about 0.1 weight percent petroleum contamination.

40. The process of claim 30 wherein the contaminated particles contain more than 1 weight percent petroleum contamination and the isolated cleansed particles contain less than about 0.1 weight percent petroleum contamination.

41. The process of claim 1 wherein the hot gases have a flow that incorporates a lateral vector and a vertical vector and the petroleum contaminant has components with different volatility.

42. The process of claim 1 wherein there is in situ solvation of petroleum contaminant.

* * * * *